United States Patent
Kinney

[11] Patent Number: 5,674,403
[45] Date of Patent: Oct. 7, 1997

[54] BACKWASH RETENTION DEVICE AND METHOD

[75] Inventor: Craig S. Kinney, Sewickley, Pa.

[73] Assignee: S. P. Kinney Engineers, Inc., Carnegie, Pa.

[21] Appl. No.: 523,787

[22] Filed: Sep. 5, 1995

[51] Int. Cl.$^6$ .................................................. C02F 1/00
[52] U.S. Cl. .................. 210/741; 210/106; 210/108; 210/791; 210/403; 210/195.1; 210/134; 210/335
[58] Field of Search .................. 210/741, 106, 210/108, 791, 403, 195.1, 257.2, 134, 130, 136, 335

[56] References Cited

U.S. PATENT DOCUMENTS

| | | | |
|---|---|---|---|
| Re. 23,469 | 3/1952 | Zollinger | 210/108 |
| 329,064 | 10/1885 | Moore | 210/427 |
| 2,925,367 | 2/1960 | Soelberg . | |
| 2,952,363 | 9/1960 | Griswold . | |
| 3,276,594 | 10/1966 | Gwilliam . | |
| 3,357,566 | 12/1967 | Schmid . | |
| 3,478,883 | 11/1969 | Deluca, Jr. . | |
| 3,542,197 | 11/1970 | Rosaen | 210/108 |
| 3,794,169 | 2/1974 | Sisk et al. . | |
| 3,819,053 | 6/1974 | Milotich | 210/108 |
| 3,868,322 | 2/1975 | Orloff | 210/108 |
| 4,153,552 | 5/1979 | Muther . | |
| 4,207,179 | 6/1980 | McCarthy et al. . | |
| 4,225,431 | 9/1980 | DeLonge . | |
| 4,352,739 | 10/1982 | Oliver, Jr. et al. | 210/108 |
| 4,394,262 | 7/1983 | Bukowski et al. | 210/108 |
| 4,405,466 | 9/1983 | Giannelli et al. . | |
| 4,861,498 | 8/1989 | Robinsky . | |
| 4,973,404 | 11/1990 | Weber et al. . | |
| 5,017,241 | 5/1991 | Ryan . | |
| 5,043,071 | 8/1991 | Anselme et al. . | |
| 5,062,968 | 11/1991 | Warning . | |
| 5,114,596 | 5/1992 | Laterra . | |
| 5,288,398 | 2/1994 | Angelino . | |
| 5,354,466 | 10/1994 | Yunoki . | |
| 5,484,536 | 1/1996 | Yamaguchi et al. | 210/108 |

*Primary Examiner*—Ana Fortuna
*Attorney, Agent, or Firm*—Armstrong, Westerman, Hattori, McLeland & Naughton

[57] ABSTRACT

Means and method of straining process streams of liquid-suspended solid particulates includes a primary industrial strainer having means periodically to remove deposited solids by generating a backwash stream. A backwash retention device (BRD) is provided for straining the backwash stream from the primary strainer. Periodically, after a predetermined number of backwash cycles, solids deposited in the BRD are removed by blowing down the BRD, producing a by-product stream more concentrated in suspended solids than the backwash stream.

15 Claims, 4 Drawing Sheets

5,674,403

1
BACKWASH RETENTION DEVICE AND METHOD

BACKGROUND

1. Field of the Invention

This invention relates to apparatus and methods for cleaning the backwash stream of industrial strainers.

2. Description of Prior Art

The use of industrial strainers for removing solid particles from process fluids streams is quite common. Such strainers comprise a rotating drum having apertures in which strainer elements are disposed. Liquid, containing suspended solids, is introduced into the drum and passed through the strainer elements on which the suspended solid particles are deposited. Clarified liquid is passed through the drum for disposal or return to the liquid entering the strainer. For example, U.S. Pat. No. 5,312,544, incorporated herein by reference, discloses such a strainer. As noted in that patent, such strainers are not operated as a centrifuge, since rotation of the drum is at a relatively low rate, for example, about 8 to 14 rpm.

Periodically, the solids deposited in the strainer elements must be removed, in order to keep the strainer elements free for passage of liquid to be strained. Typically, this is accomplished by backwashing the strainer elements with the process liquid, that is, by reversing the direction of fluid flow through the strainer elements in a limited portion of the rotating strainer drum, whereby deposited solids are washed out of the strainer elements and carried away in a backwash fluid stream. In the past, such backwash fluid stream, containing a relatively high concentration of suspended solids, was simply disposed of to the sewer or other disposal site. Suck an operation also is shown in U.S. Pat. No. 5,312,544.

SUMMARY OF THE INVENTION

This present invention provides a backwash retention device (BRD), comprising a hollow filter element, for example in the form of a cylindrical drum, having a plurality of apertures for entrapping solid particles suspended in the backwash stream when the backwash fluid stream is introduced to one side, e.g. the interior, of the filter element and passed through the apertures therein to the exterior of the filter element. The interior of the BRD is connected to the backwash fluid stream outlet of a primary industrial strainer by a line containing a first isolation valve for establishing and disconnecting communication between the primary strainer backwash stream and the BRD.

In another embodiment of the invention, the BRD is connected to the fluid inlet to the primary strainer by a line having a second isolation valve therein, whereby when the primary strainer is completely isolated from fluid flow, fluid to be strained by-passes the primary strainer and is introduced directed into the BRD which thus serves as a primary strainer while the principal strainer itself is isolated for repair or maintenance.

DESCRIPTION OF PREFERRED EMBODIMENTS

Figure 1:
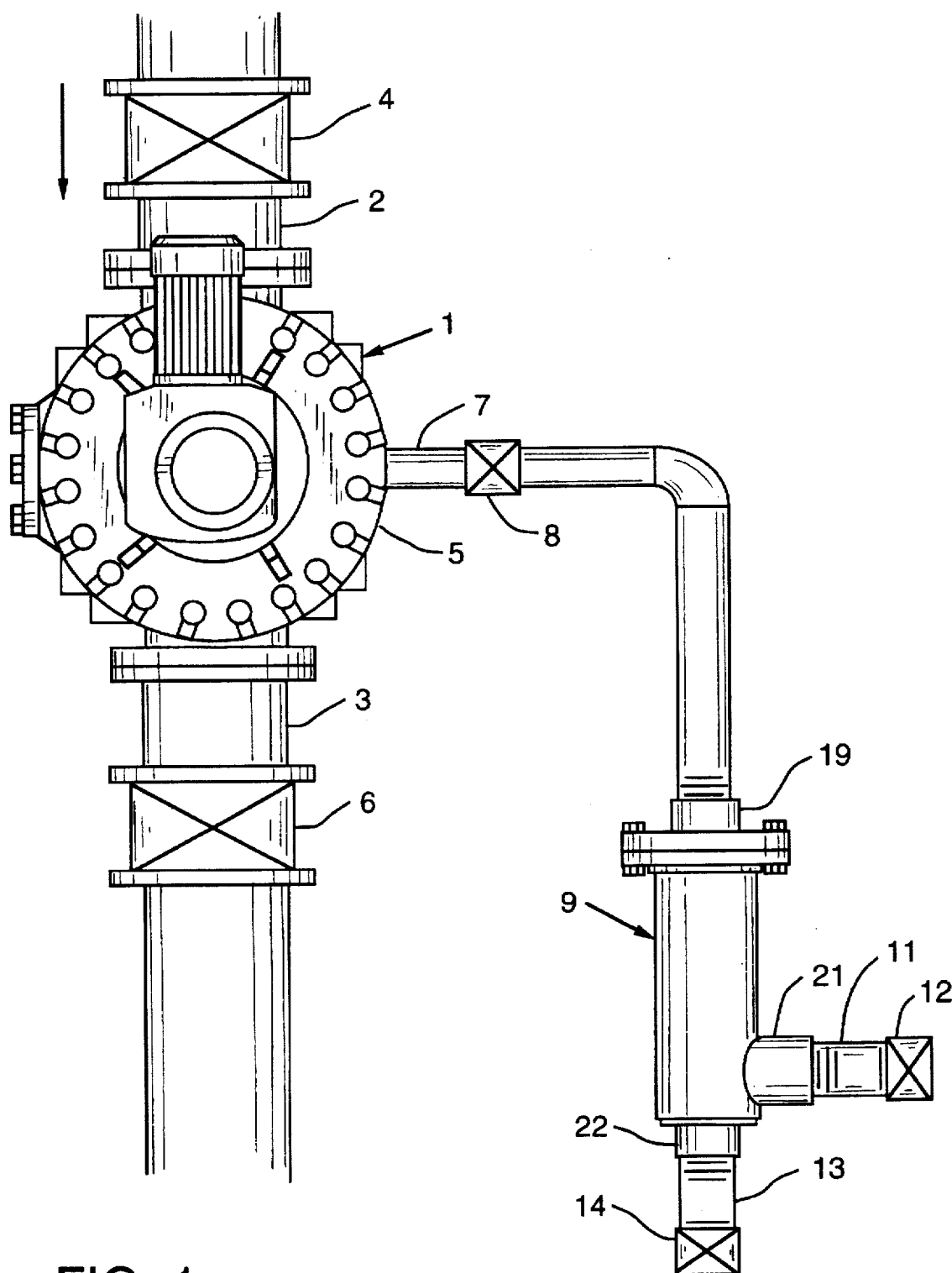
FIG. 1 is a schematic diagram of a strainer connected through a backwash check valve to the BRD.

In FIG. 1 a primary strainer, generally denoted by the numeral 1, has a housing 5 provided with an inlet 2 for a fluid stream to be strained, and an outlet 3 for the strained fluid stream. Inlet valve 4 is provided in the inlet stream line 2, and outlet valve 6 is provided in the outlet stream line 3. Strainer 1 also is provided with a backwash fluid outlet line 7 and a first isolation valve 8. Line 7 connects the strainer 1, through valve 8, to a backwash retention device (BRD), denoted generally by the numeral 9. Device 9 is provided with an outlet fluid stream line 11 having a backwash valve 12 therein, and a blowdown line 13 having a blowdown valve 14 therein. Valve 8 serves, when closed, to isolate the BRD 9 for repair or maintenance.

In operation of this embodiment, periodically, as determined by a timer or by a pressure differential controller, backwash fluid enters line 7 from primary strainer 1, passes to the BRD 9 where the backwash fluid stream is strained and the cleaned fluid stream passes out through outlet line 11 and valve 12. The cleaned fluid stream may be returned to the outlet stream of the primary strainer, recycled for reuse, or otherwise disposed of. Periodically, blowdown valve 14 is opened and accumulated solids plus liquid is discharged from device 9 through blowdown line 13. The blowdown stream is highly concentrated in suspended solids so that the volume of material to be disposed of is reduced.

Figure 2A:
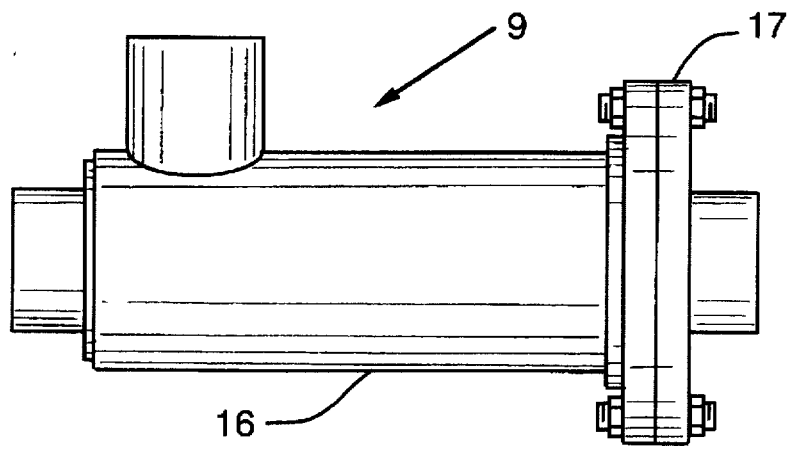
FIG. 2A is a plan view of the BRD.
Figure 2B:
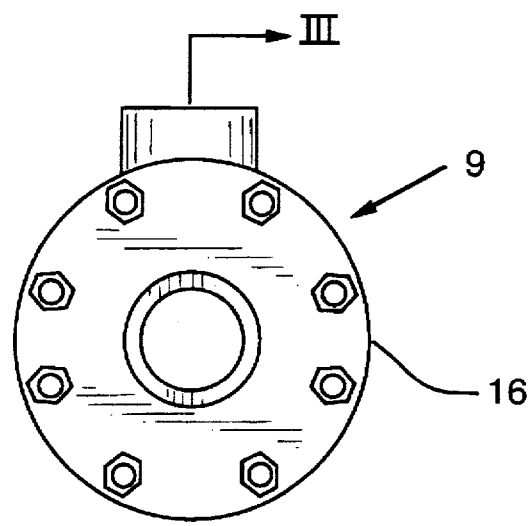
FIG. 2B is an end view of the BRD.
Figure 3:
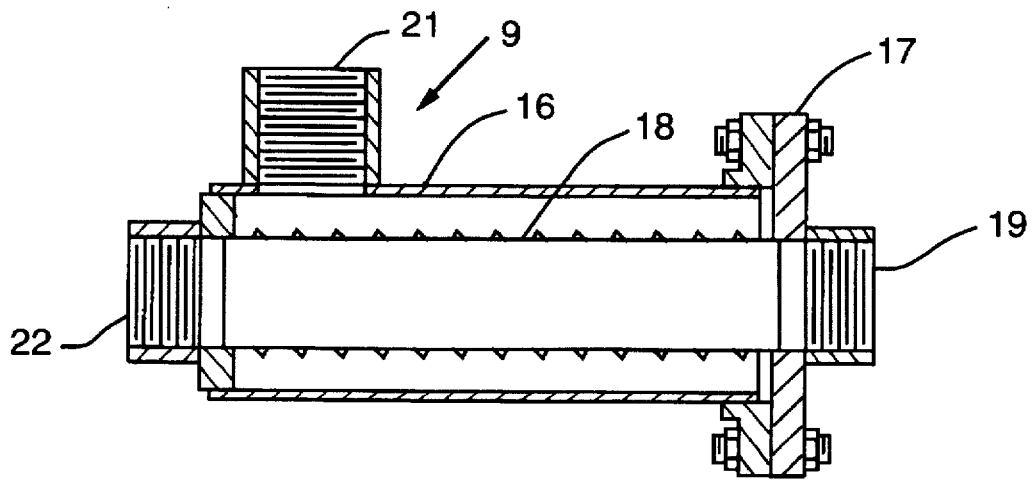
FIG. 3 is a cross-section view of the BRD, taken along line A—A of FIG. 2B.

As more clearly shown in FIGS. 2A, 2B and 3, the BRD comprises an outer shell 16, mounted, by means of a flange fitting 17, about an inner shell 18 having a plurality of fine apertures extending therethrough and serving to filter larger particles out of the backwash fluid stream which is introduced into the interior of inner shell 18 through an inlet 19. The cleaned fluid stream exits the backwash retention device 9 through an outlet 21 to line 11 and thence through back ash valve 12. Periodic blow-down of the backwash retention device results in liquid-entrained solids being ejected through a blow-down outlet 22.

Figure 4:
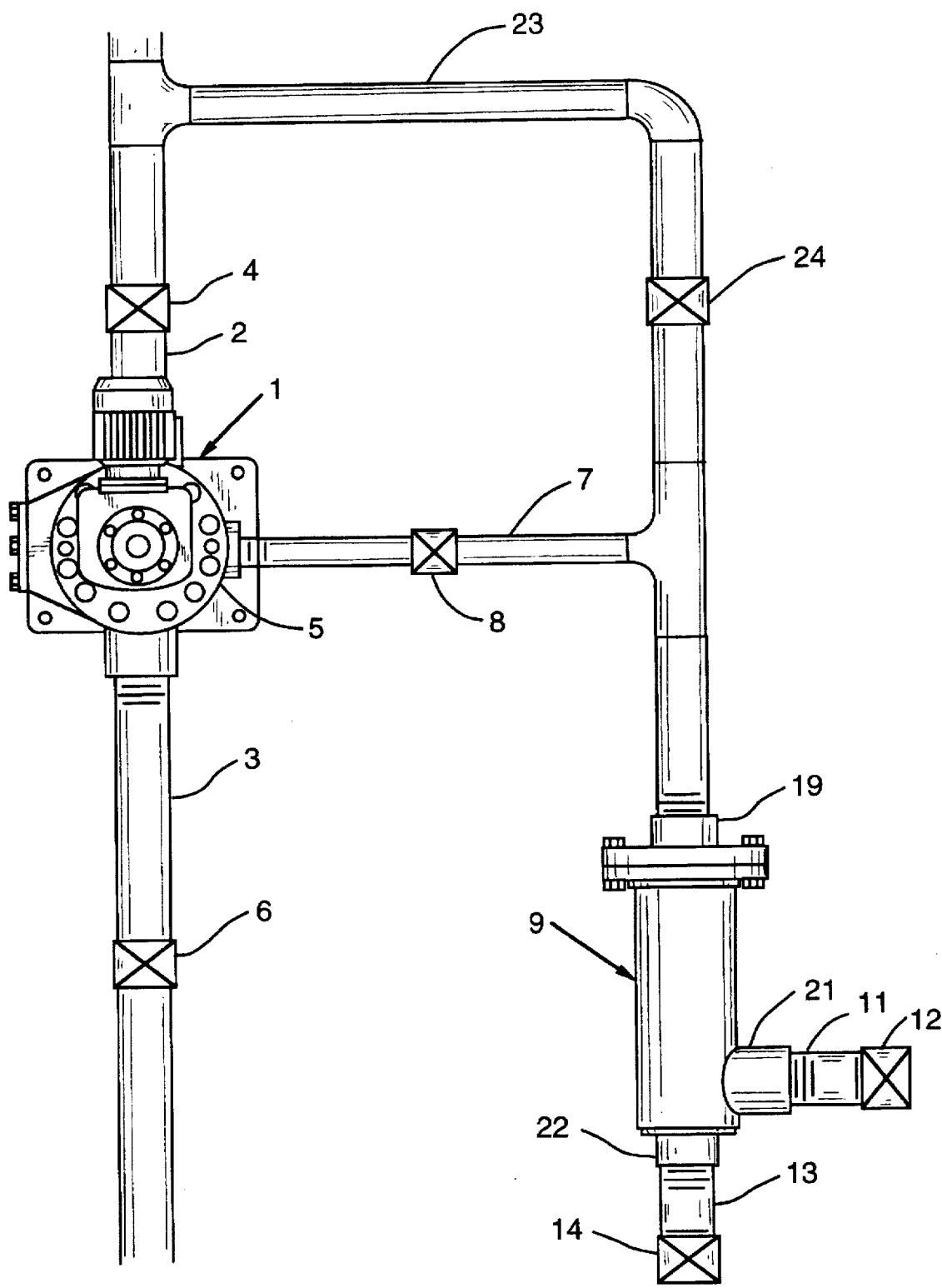
FIG. 4 is a schematic diagram of an alternate embodiment of the invention, wherein there is provided an upper fluid circuit by means of which the strainer can be isolated from the process fluid stream and the back ash retention device serves as a primary strainer.

Another embodiment of the invention, particularly useful with industrial strainers having fluid inlet lines less than 8 inches in diameter, is shown in FIG. 4. In that Fig., a further fluid line 23 is connected to the primary strainer fluid inlet line 2 and is connected, through a second isolation valve 24, to backwash fluid stream line 7 and BRD 9. By closing valves 4, 6 and 8, strainer 1 can be isolated from the process fluid stream to be strained and that fluid stream then is directed through line 23 and open valve 24 to the BRD 9 which, in such configuration, serves as an alternate strainer, for example, during repair or maintenance of the primary strainer 1.

Figure 5:
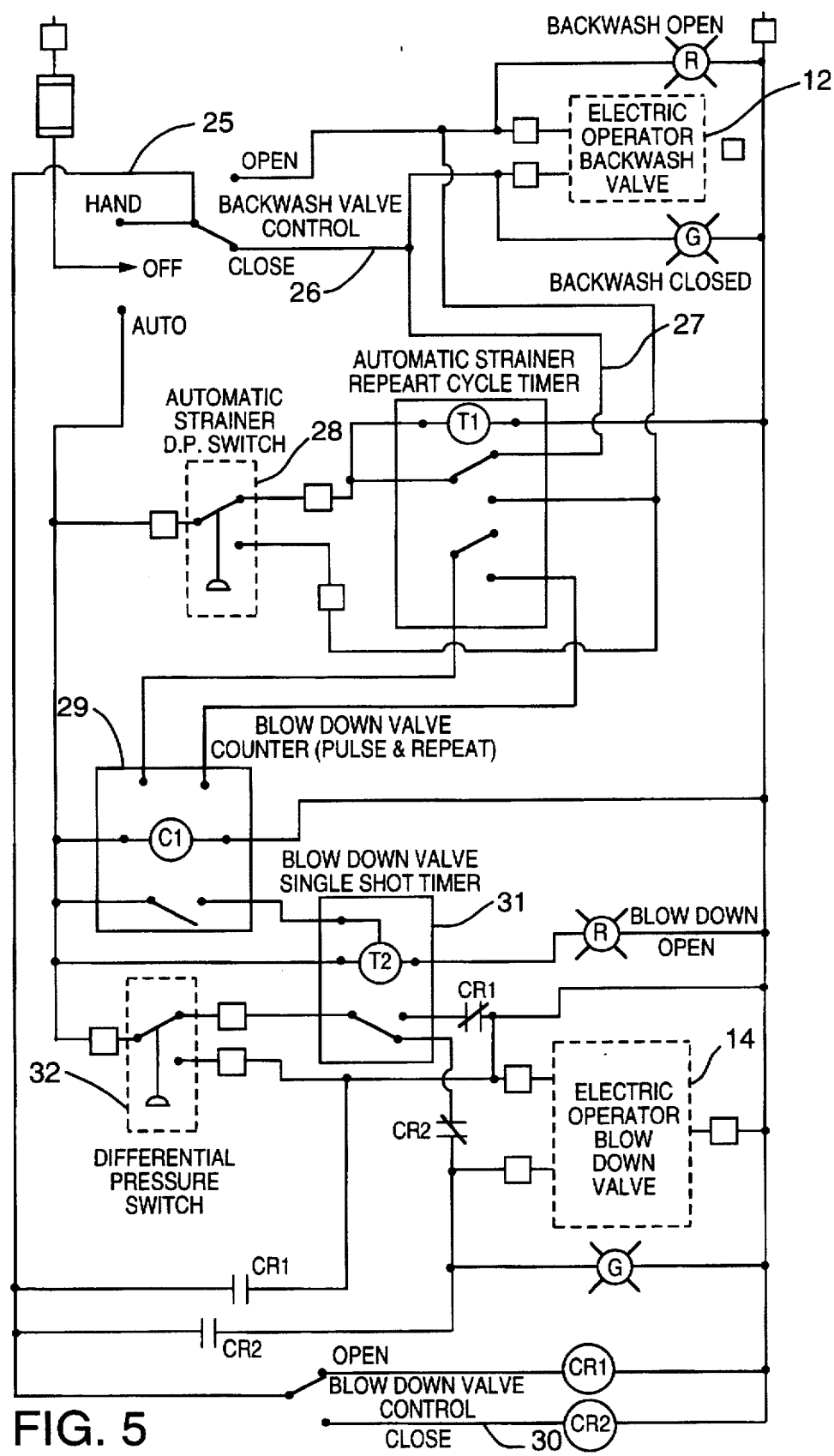
FIG. 5 is a control diagram showing a means of control of operation of the inventive device and method.

Turning next to FIG. 5, the numeral 25 denotes a switch by means of which operation of the backwash valve 12 can be switched to manual or automatic control and operated through a backwash valve controller 26. With switch 25 set in the manual or hand position, the backwash valve 12 opens and remains open when the controller 26 is moved to the "open" position and closes and remains closed when controller 26 is moved to the "closed" position. Similarly, a switch 30 controls manual operation of the blow down valve 14. The manual mode of operation of the backwash valve 12 and the blow down valve 14 is an override to an automatic mode of operation and, in the manual mode, the backwash valve 12 and the blowdown valve 14 are opened and closed manually by visual observation of pressure gages (not shown) measuring the actual pressure drop across the primary strainer 1 and BRD 9.

As indicated, the apparatus of the invention also is operable in an automatic mode. For such purpose, there is provided an automatic strainer repeat cycle timer 27, an automatic primary strainer differential pressure switch 28 which reads the pressure drop across the primary strainer inlet and outlet, a blow down valve counter (pulse and repeat) 29, a blow down valve single shot timer 31, and a second or blow down differential pressure switch 32 which reads the pressure drop across the BRD 9.

With the switch 25 in the automatic position, operation of the blow down valve 14 is controlled by counter 29, single shot timer 31 and differential pressure switch 32. The counter 29 is tied into the repeat cycle timer 27 and is set to a predetermined number of primary strainer backwash cycles. When this preset number of cycles is reached, the single shot timer 31 energizes and opens the blow down valve 14 and the retention device 9 is flushed out. After the single shot timer operates, the blow down valve is closed and the counter 29 goes back to zero. If, at any time, the automatic differential pressure switch 28 detects that the actual pressure drop across the primary strainer 1 has increased more than a predetermined extent, e.g. approximately 3 p.s.i.g., above the normal pressure drop, the backwash valve 12 is opened and remains open until the actual pressure drop across the primary strainer has decreased to the normal pressure drop. At that point, control of the backwash valve 12 returns to the repeat cycle timer 27. In essence, the straining media of the primary strainer 1 is backwashed on regular time intervals as prescribed by the repeat cycle timer and, if at any time the periodic backwashing is insufficient and unacceptably high pressure drop across the primary strainer occurs, the automatic strainer differential pressure switch 28 overrides the repeat cycle timer 27 and opens the backwash valve 12 and keeps it open until the actual pressure drop of the primary strainer equals the normal pressure drop.

If, at any time, differential pressure switch 32 detects that the actual pressure drop across the BRD 9 has increased a predetermined extent, e.g. approximately 3 p.s.i.g., above the normal pressure drop, the blow down valve 14 opens and remains open until the actual pressure drop across the BRD 9 decreases to the normal pressure drop, at which point, control of the blow down valve is returned to the counter 29 and the single shot timer 31.

The apparatus and methods of the invention can be used to treat many types of process fluid streams comprising particulate solids entrained in a liquid, including but not limited to such streams generated in the paper, steel and other industries. The invention is environmentally advantageous in reducing the total amount of solids-containing waste for disposal.

What is claimed is:

1. A method of straining a process stream comprising a liquid containing suspended solid particles, by passing the process stream through a primary strainer of the type comprising a housing, a rotatable drum mounted within the housing and provided with a plurality of apertures in which are mounted corresponding plurality of strainer elements, and means to periodically reverse the direction of fluid flow through the primary strainer elements in a limited portion of the rotatable drum whereby deposited solids are washed out of the strainer elements and thereby generating a backwash stream of liquid and suspended solid particles in a solids concentration greater than the concentration of solids in the process stream, the improvement comprising straining the backwash stream through a backwash retention device having an outer shell and an inner shell provided with a plurality of apertures to entrap solid particles on an inner surface of the inner shell, periodically blowing down the interior of the inner shell of the backwash retention device to produce a blowdown stream comprising liquid and suspended solid particles in a concentration greater than the concentration of solids in the backwash stream, and disposing of the concentrated blowdown stream to a waste environment.

2. A method according to claim 1, wherein the backwash retention device comprises a cylindrical drum mounted in a backwash drum housing provided with a liquid exit line communicating with a space between an exterior surface of the backwash drum and an interior surface of the backwash drum housing, and a blowdown line provided with a blowdown valve and communicating with one end of an interior of the backwash drum, introducing the backwash stream into an interior of the backwash drum at another end thereof so that liquid passes through the apertures in the backwash drum into a space between an exterior of the backwash drum and an interior of the backwash drum housing and out of the liquid exit line and solids are collected on an interior surface of the backwash drum, and periodically opening the blowdown valve and blowing down the interior of the backwash drum thereby producing a blowdown stream more concentrated in solids than the backwash stream.

3. A method according to claim 2, comprising controlling operation of the blow down valve by means of a counter, connecting the counter to a repeat cycle timer, setting the counter to a predetermined number of primary strainer backwash cycles and, when this number of cycles is reached, energizing a single shot timer to open the blow down valve.

4. A method according to claim 3, further comprising detecting pressure drop across an inlet and outlet of the backwash retention device, opening the blow down valve when a detected pressure drop exceeds a predetermined value, keeping the blow down valve open until the pressure drop returns to a normal value, and then returning control of the blow down valve to the counter and the single shot timer.

5. A method of straining a process stream of liquid and suspended solid particles in an apparatus comprising a process stream line provided with a process stream inlet valve disposed upstream of a process stream inlet to a primary strainer provided with a strained liquid outlet having a strained liquid outlet valve mounted therein, means to periodically generate from the primary strainer a backwash stream of liquid and solids more concentrated in solids than the process stream and to direct the backwash stream into a backwash stream line having a first isolation valve disposed therein and having an upstream end connected to the primary strainer and a downstream end connected to an inlet line of a backwash retention device, a backwash valve disposed in an outlet line of the backwash retention device, an alternate process stream line disposed upstream of the process stream inlet valve and connected to a downstream end of the backwash stream line at the point of its connection to the inlet line to the backwash retention device and having second isolation valve disposed in the alternate process stream line upstream of its connection with the backwash stream line to direct the process stream alternately to the inlet line to the backwash retention device, said process comprising alternately (a) opening the process stream inlet valve, the strained liquid outlet valve, and the first isolation valve, closing the second isolation valve in the alternate process stream line, and periodically opening the backwash valve to backwash the primary strainer and passing the backwash stream to the backwash retention device, and (b) closing the process stream inlet valve, the strained liquid outlet valve and the first isolation valve, and opening the second isolation valve and the backwash valve to direct the process stream directly to the backwash retention device thereby isolating the primary strainer from the process stream for maintenance and repair of the primary strainer and temporarily carrying out primary straining of the process stream in the backwash retention device.

6. A method according to claim 5, wherein the backwash retention device periodically is blown down to clean the backwash retention device.

7. A method of straining a process stream of liquid and suspended solids, by directing the process stream to a rotatable primary strainer of the type having strainer elements mounted therein, and means to reverse the direction of fluid flow through the strainer elements in a limited portion of the rotatable primary strainer whereby deposited solids are washed out of the strainer elements and a backwash stream of liquid and suspended solid particles is generated in a solids concentration greater than the solids concentration in the process stream, and periodically generating a backwash stream of liquid and solids, the improvement comprising arranging a backwash retention device in series with the primary strainer, directing the backwash stream to the backwash retention device, and periodically blowing down the backwash retention device and producing a blowdown stream more concentrated in solids content than the backwash stream.

8. A method according to claim 7, wherein the process stream temporarily is passed directly to the backwash retention device, thereby by-passing the primary strainer which thus is isolated for repair and maintenance.

9. Apparatus for straining suspended solid particulates from a liquid stream, including a primary strainer of the type comprising a housing; an input fluid stream line for introducing into the primary strainer an input fluid stream containing suspended solids and having disposed therein a primary strainer inlet valve; a rotating drum mounted in the housing and having apertures in which are mounted a plurality of strainer elements to remove suspended solids from the input fluid stream; a primary strainer outlet line for removing strained liquid from the primary strainer and having a primary strainer outlet valve disposed therein, and means for periodically reversing the direction of fluid flow through the primary strainer elements in a limited portion of the rotating drum whereby deposited solids are washed out of the strainer elements and thereby and generating a backwash fluid stream containing an increased concentration of suspended solids, and a backwash fluid outlet line connected to the primary strainer to remove the backwash fluid stream therefrom, the improvement comprising backwash fluid treatment means comprising: a backwash retention device disposed in series arrangement with the primary strainer and having a backwash fluid inlet line connected to the primary strainer backwash fluid outlet line, and comprising:

an outer shell provided with a backwash retention device fluid outlet line;

a perforated inner shell mounted inside the outer shell and adapted to receive therein the backwash fluid stream from the backwash fluid outlet line from the primary strainer and to pass strained liquid through perforations in the inner shell and into a space between the inner shell and the outer shell and through the backwash retention device fluid outlet line;

a blowdown line communicating with the interior of the inner shell;

a backwash valve disposed in the backwash retention device fluid outlet line, and a blowdown valve disposed in the blowdown line and adapted to be opened periodically, and on closing of the backwash valve, to blow down the contents of the inner shell and thereby to remove solids entrapped on the inner surface of the inner shell.

10. Apparatus according to claim 9, further comprising a first isolation valve disposed in the backwash fluid stream from the primary strainer and adapted on closure of said valve to isolate the backwash retention device for repair or maintenance thereof.

11. Apparatus according to claim 10, further comprising a by-pass line connected at one end to the input fluid stream line to the primary strainer upstream from the primary strainer inlet valve and connected at the other end to the backwash inlet line, and a second isolation valve disposed in the by-pass line at a position upstream of connection of the backwash inlet line to the backwash outlet line from the primary strainer, whereby, when the primary strainer inlet valve, the primary strainer outlet valve, and the first isolation valve in the backwash outlet line are in a closed position, and the second isolation valve is in an open position, the input fluid stream flows directly to the backwash retention device, thereby isolating the primary strainer for repair or maintenance thereof.

12. Apparatus according to claim 9, further comprising a repeat cycle timer for establishing time intervals for opening and closing the backwash valve, means to detect a pressure drop across the primary strainer inlet and outlet, to open the backwash valve when the detected pressure drop exceeds a predetermined value and to return control of the backwash valve to the repeat cycle timer when the pressure drop has returned to a normal value.

13. Apparatus according to claim 12, further comprising a blow down valve counter connected to the repeat cycle timer and set to a predetermined number of backwash cycles, a single shot timer energizable when the predetermined number of backwash cycles is reached and serving to open the blow down valve and flush out the backwash retention device.

14. Apparatus according to claim 13, further comprising means to detect pressure drop across an inlet and outlet of the backwash retention device, to open the blow down valve when the detected pressure drop exceeds a predetermined value, and to return control of the blow down valve to the counter and the single shot timer when the pressure drop returns to a normal value.

15. A system for straining suspended solids from a fluid stream, including a primary strainer of the type comprising a housing a rotating drum mounted within the housing and having a plurality of perforations with strainer elements mounted therein to remove at least a portion of the suspended solids from the fluid stream, and means for periodically reversing the direction of fluid flow through the primary strainer elements in a limited portion of the rotating drum whereby deposited solids are washed out of the strainer elements and thereby generating a backwash stream of liquid and an increased concentration of suspended solids, the improvement comprising a backwash retention device arranged in series with the primary strainer and adapted to receive the backwash stream and to remove suspended solids therefrom, said backwash retention device comprising an outer shell and an apertured inner shell mounted inside the outer shell and adapted to receive therein the backwash stream from the primary strainer and to pass strained liquid through apertures in the inner shell and into a space between the inner shell and the outer shell and adapted to entrap suspended solids on an inner surface of the inner shell, means to remove strained liquid from the space between the inner and outer shells, and means to periodically blow down the interior of the inner shell to remove entrapped solids from the inner surface of the inner shell.

* * * * *